(12) United States Patent
Travostino et al.

(10) Patent No.: US 9,414,404 B1
(45) Date of Patent: Aug. 9, 2016

(54) COALESCING APPLICATION DATA ACTIVITY FROM MULTIPLE APPLICATIONS

(71) Applicant: Apple Inc., Cupertino, CA (US)

(72) Inventors: Franco Travostino, San Jose, CA (US); Padmavathy Bhooma, San Jose, CA (US); Vu H. Chiem, San Jose, CA (US); Vincent Lubet, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/726,420

(22) Filed: May 29, 2015

(51) Int. Cl.
*H04W 48/18* (2009.01)
*H04W 72/12* (2009.01)

(52) U.S. Cl.
CPC .......... *H04W 72/1268* (2013.01); *H04W 48/18* (2013.01)

(58) Field of Classification Search
CPC ..... H04W 72/04; H04W 76/02; H04W 16/10; H04W 28/16; H04W 16/14; H04W 72/1268; H04W 48/18
See application file for complete search history.

(56) References Cited

U.S. PATENT DOCUMENTS

| 8,345,616 | B2 | 1/2013 | Navda et al. | |
|---|---|---|---|---|
| 8,687,567 | B2 | 4/2014 | Chen et al. | |
| 2011/0208984 | A1* | 8/2011 | Naware | H04W 52/0229 713/320 |
| 2012/0207040 | A1* | 8/2012 | Comsa | H04W 72/1215 370/252 |
| 2012/0224694 | A1* | 9/2012 | Lu | H04L 63/0876 380/270 |
| 2012/0324041 | A1 | 12/2012 | Gerber et al. | |
| 2013/0003591 | A1* | 1/2013 | Novak | H04W 36/06 370/252 |
| 2013/0194994 | A1* | 8/2013 | Dayal | H04W 76/048 370/311 |
| 2014/0115406 | A1 | 4/2014 | Agrawal et al. | |

\* cited by examiner

*Primary Examiner* — Ted Wang
(74) *Attorney, Agent, or Firm* — Meyertons Hood Kivlin Kowert & Goetzel, P.C.; Jeffrey C. Hood; Joel L. Stevens

(57) ABSTRACT

Embodiments are presented herein of apparatuses, systems, and methods for selecting a RAT and coalescing application data activities for transmission using the RAT. A plurality of applications may be executed by a UE. During execution, the UE may receive a request to perform communication from each of the plurality of applications. Each request may include a deadline for performing the communication. The UE may further determine a RAT for performing the plurality of communications and schedule the plurality of communications. Scheduling may include combining the plurality of communications to be performed at a scheduled time using the RAT. Accordingly, the plurality of communications may be performed at the scheduled time using the RAT based on said scheduling.

20 Claims, 10 Drawing Sheets

COALESCING APPLICATION DATA ACTIVITY FROM MULTIPLE APPLICATIONS

FIELD

The present application relates to wireless devices, including to apparatuses, systems and methods for selecting a RAT and coalescing application data activities for transmission using the RAT.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others.

Wireless communication technologies may be capable of providing a variety of services, and may be used by a variety of applications. Different applications utilizing wireless communication may have different characteristics and may use various connections in different ways. When multiple applications are active, it may be the case that those applications' networking activities are not coordinated with each other. This can lead to an unnecessarily large number of connections being created and inefficient use of those connections, which can have negative power use and/or performance implications. Accordingly, improvements in the field would be desirable.

SUMMARY

Embodiments are presented herein of apparatuses, systems, and methods for selecting a RAT and coalescing application data activities for transmission using the RAT.

One embodiment may include a wireless user equipment (UE) device, comprising: a plurality of radios, each configured to communicate using a respective radio access technology (RAT) and a processor coupled to the plurality of radios. The processor is configured to execute a plurality of applications. During execution, the processor may receive a request to perform communication from each of the plurality of applications. Each request may include a deadline for performing the communication. The processor may further determine a RAT for performing the plurality of communications and schedule the plurality of communications. Scheduling may include combining the plurality of communications to be performed at a scheduled time using the RAT. Accordingly, the plurality of communications may be performed at the scheduled time using the RAT based on said scheduling.

Some embodiments may include a method that includes receiving a request to perform one or more network activities from each of a plurality of applications executing on the application processor of the UE. Each request may have an associated deadline for performing the one or more network activities. A plurality of opportunities for performing the network activities across a plurality of different radio access technologies (RATs) may be determined. Using the deadlines, a time from the plurality of opportunities using a RAT from the plurality of RATs for performing the network activities may be scheduled. Based on scheduling, each of the network activities may be performed at the time using the RAT.

Some embodiments may include a non-transitory, computer accessible memory medium storing program instructions, wherein the program instructions, when executed by a processor of a wireless user equipment (UE), implement: a plurality of applications and a scheduler. Each application may be configured to periodically generate a request to perform communication associated with the respective application and provide the request to the scheduler of the UE. Each request may include a deadline for performing the communication. The scheduler may be configured to receive each request from the plurality of applications and using the deadlines, determine a time to combine at least two communications of at least two respective applications and a radio access technology (RAT) among a plurality of available RATs for performing the at least two communications at the time. Accordingly, the UE may be configured to perform the at least two communications at the time using the RAT.

The techniques described herein may be implemented in and/or used with a number of different types of devices, including but not limited to cellular phones, cellular base stations, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
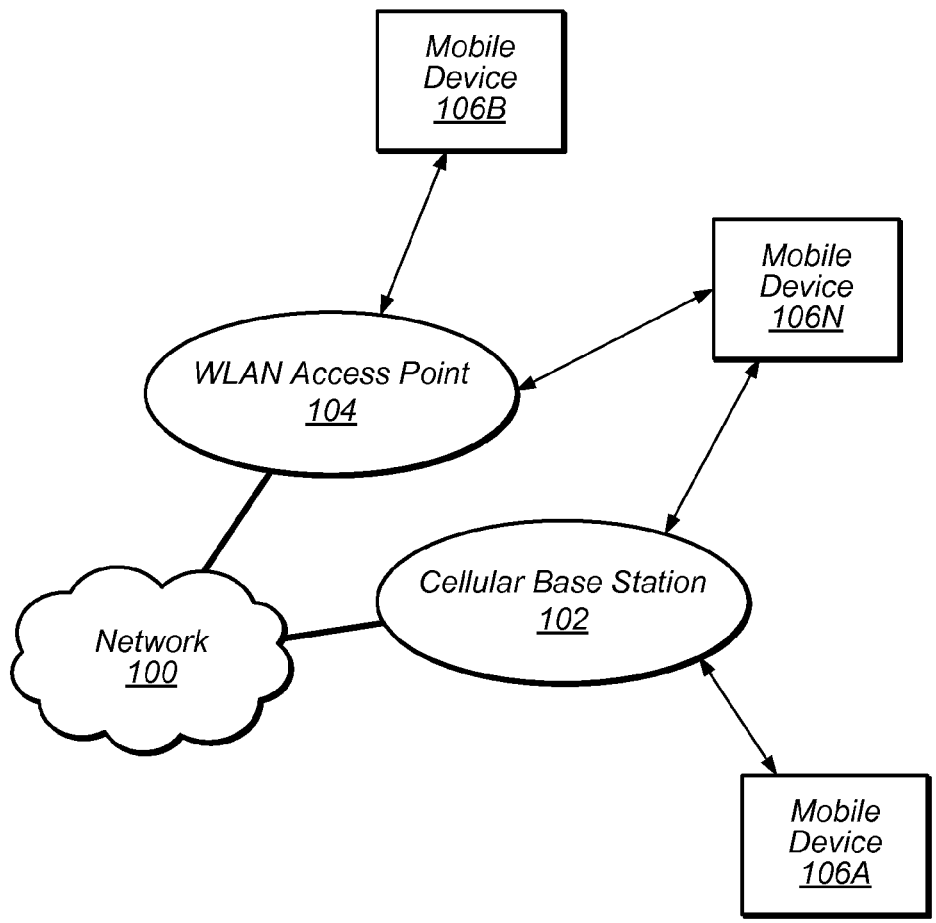
FIG. 1 illustrates an exemplary (and simplified) wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.
3GPP: Third Generation Partnership Project
3GPP2: Third Generation Partnership Project 2
GSM: Global System for Mobile Communications
GERAN: GSM EDGE Radio Access Network
UMTS: Universal Mobile Telecommunications System
UTRAN: UMTS Terrestrial Radio Access Network or Universal Terrestrial Radio Access Network
LTE: Long Term Evolution
RAN: Radio Access Network
E-UTRAN: Evolved UMTS Radio Access Network or Evolved Universal Radio Access Network
EPC: Evolved Packet Core
EPS: Evolved Packet Service
MME: Mobility Management Entity
HSS: Home Subscriber Server
RRC: Radio Resource Control
RLC: Radio Link Control

TERMS

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
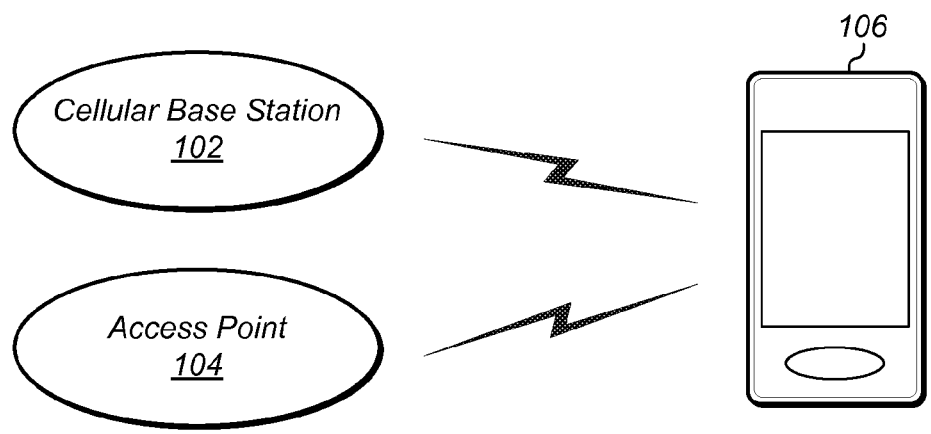
FIG. 2 illustrates a base station (BS) in communication with a user equipment (UE) device, according to some embodiments.
Figure 3:
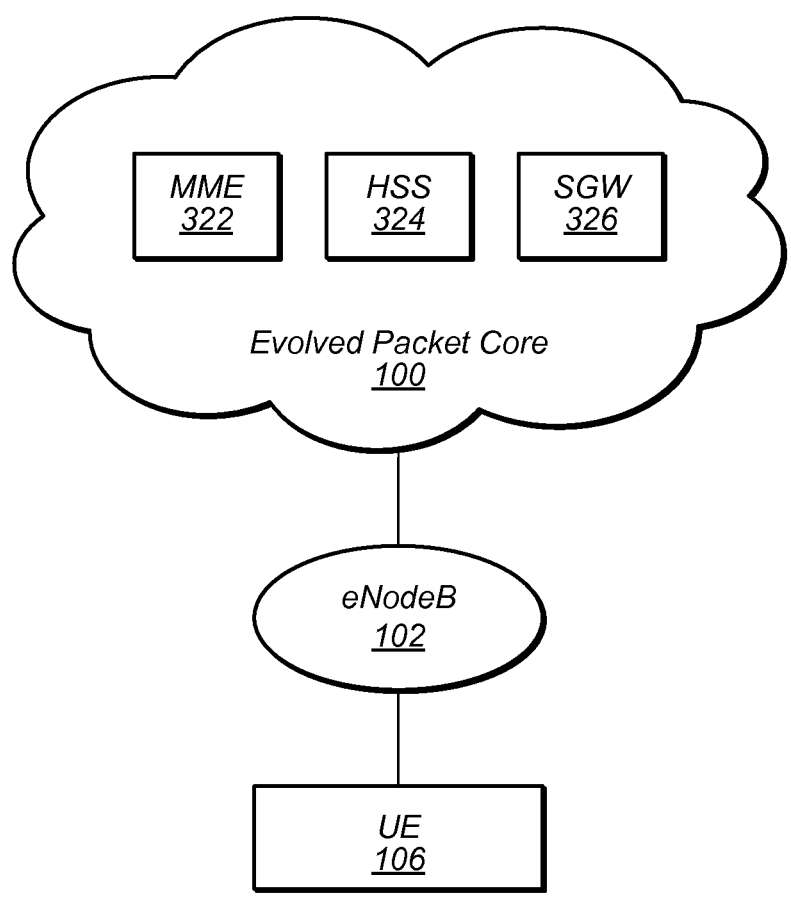
FIG. 3 illustrates an exemplary (and simplified) cellular network architecture, according to some embodiments.

FIGS. 1-3—Communication System

FIG. 1 illustrates an exemplary (and simplified) wireless communication system. It is noted that the system of FIG. 1 is merely one example of a possible system, and embodiments of the invention may be implemented in any of various systems, as desired.

As shown, the example wireless communication system includes a cellular base station 102 which may communicate over a transmission medium with one or more mobile devices 106A, 106B, etc., through 106N. Each of the mobile devices may be, for example, a "user equipment" (UE) or other types of devices as defined above.

The base station 102 may be a base transceiver station (BTS) or cell site, and may include hardware that enables wireless cellular communication with the UEs 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the mobile devices and/or between the mobile devices and the network 100.

The communication area (or coverage area) of the base station may be referred to as a "cell." The base station 102 and the UEs 106 may be configured to communicate over the transmission medium using any of various cellular radio access technologies (RATs), also referred to as wireless cellular communication technologies, or telecommunication standards, such as GSM, UMTS (WCDMA, TD-SCDMA), LTE, LTE-Advanced (LTE-A), 3GPP2 CDMA2000 (e.g., 1×RTT, 1×EV-DO, HRPD, eHRPD), Wi-Fi, WiMAX etc. A typical wireless cellular communication system will include a plurality of cellular base stations which provide different coverage areas or cells, with handoffs between cells.

Additionally, the example wireless communication system may include one or more wireless access points (such as access point 104) which may be communicatively coupled to the network 100. Each wireless access point 104 may provide a wireless local area network (WLAN) for communication with mobile devices 106. These wireless access points may comprise Wi-Fi access points. Wireless access point 104 may be configured to support cellular network offloading and/or otherwise provide wireless communication services as part of the wireless communication system illustrated in FIG. 1.

1) Cellular base station 102 and other similar base stations and 2) access points (such as access point 104) operating according to a different wireless communication standard may thus be provided as a network which may provide continuous or nearly continuous overlapping service to mobile devices 106 and similar devices over a wide geographic area via one or more wireless communication standards.

Thus, while base station 102 may act as a "serving cell" for a UE 106 as illustrated in FIG. 1, each mobile device 106 may also be capable of receiving signals from (and possibly within communication range of) one or more other cells (which might be provided by other base stations (not shown) and/or wireless local area network (WLAN) access points, which may be referred to as "neighboring cells" or "neighboring WLANs" (e.g., as appropriate), and/or more generally as "neighbors".

FIG. 2 illustrates mobile device 106 (e.g., one of the devices 106A through 106N) in communication with both a Wi-Fi access point 104 and a cellular base station 102. The mobile device 106 may be a device with both cellular communication capability and non-cellular communication capability, e.g., Wi-Fi capability, such as a mobile phone, a hand-held device, a computer or a tablet, or virtually any type of wireless device.

The mobile device 106 may include a processor that is configured to execute program instructions stored in memory. The mobile device 106 may perform any of the method embodiments described herein by executing such stored instructions. Alternatively, or in addition, the mobile device 106 may include a programmable hardware element such as an FPGA (field-programmable gate array) that is configured to perform any of the method embodiments described herein, or any portion of any of the method embodiments described herein.

In some embodiments, the mobile device 106 may be configured to communicate using any of multiple radio access technologies/wireless communication protocols. For example, the mobile device 106 may be configured to communicate using any of various cellular communication technologies, such as GSM, UMTS, CDMA2000, LTE, LTE-A, etc. The mobile device may also be configured to communicate using any of various non-cellular communication technologies such as WLAN/Wi-Fi, or GNSS. Other combinations of wireless communication technologies are also possible.

The mobile device 106 may include one or more antennas for communicating using one or more wireless communication protocols or technologies. In one embodiment, the mobile device 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the mobile device 106 may share one or more parts of a receive and/or transmit chain between multiple wireless communication technologies, such as those discussed above.

In some embodiments, the mobile device 106 may include separate transmit and/or receive chains (e.g., including separate RF and/or digital radio components) for each wireless communication protocol with which it is configured to communicate. As a further possibility, the mobile device 106 may include one or more radios which are shared between multiple wireless communication protocols, and one or more radios which are used exclusively by a single wireless communication protocol. For example, the mobile device 106 might include a shared radio for communicating using either of LTE or 1×RTT (or LTE or GSM), and separate radios for communicating using each of Wi-Fi and Bluetooth. Other configurations are also possible.

FIG. 3 illustrates an exemplary, simplified portion of a wireless communication system, such as a 3GPP compliant cellular network, according to some embodiments.

As shown, a UE 106 may be in communication with a base station, shown in this exemplary embodiment as an eNodeB 102. In turn, the eNodeB may be coupled to a core network, shown in this exemplary embodiment as an evolved packet core (EPC) 100. As shown, the EPC 100 may include mobility management entity (MME) 322, home subscriber server (HSS) 324, and serving gateway (SGW) 326. The EPC 100 may include various other devices and/or entities known to those skilled in the art as well.

Figure 4:
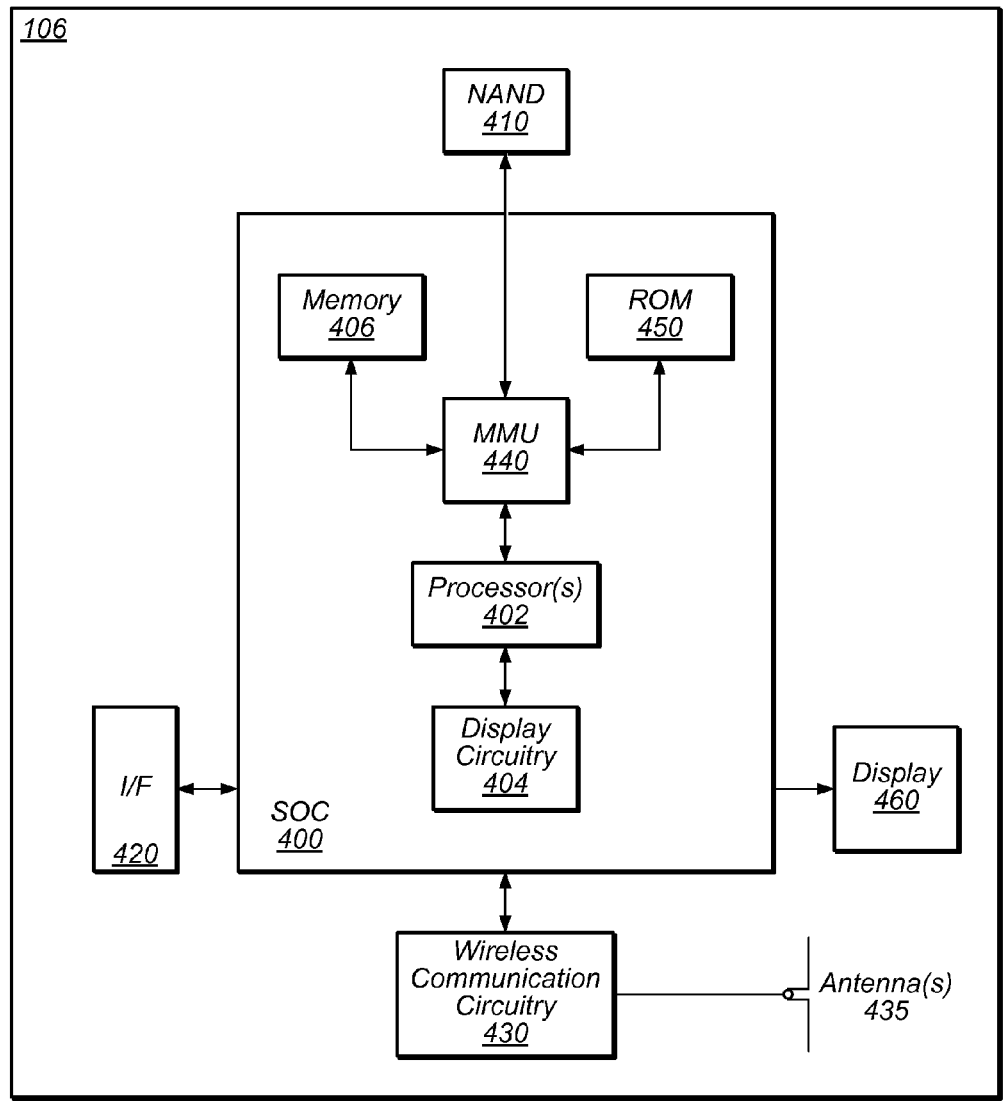
FIG. 4 illustrates an exemplary block diagram of a UE, according to some embodiments.

FIG. 4—Exemplary Block Diagram of a UE

FIG. 4 illustrates an exemplary block diagram of a UE 106, according to some embodiments. As shown, the UE 106 may include a system on chip (SOC) 400, which may include portions for various purposes. For example, as shown, the SOC 400 may include processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, wireless communication circuitry 430, connector I/F 420, and/or display 460. The MMU 440 may be configured to perform memory protection and page table translation or set up. In some embodiments, the MMU 440 may be included as a portion of the processor(s) 402.

As also shown, the SOC 400 may be coupled to various other circuits of the UE 106. For example, the UE 106 may include various types of memory (e.g., including NAND flash 410), a connector interface 420 (e.g., for coupling to a computer system, dock, charging station, etc.), the display 460, and wireless communication circuitry 430 (e.g., for LTE, CDMA2000, Bluetooth, Wi-Fi, etc.).

As noted above, the UE 106 may be configured to communicate wirelessly using multiple wireless communication technologies. As further noted above, in such instances, the wireless communication circuitry 430 may include radio components which are shared between multiple wireless communication technologies and/or radio components which are configured exclusively for use according to a single wireless communication technology. As shown, the UE device 106 may include at least one antenna (and possibly multiple antennas, e.g., for MIMO and/or for implementing different wireless communication technologies, among various possibilities), for performing wireless communication with cellular base stations and/or other devices. For example, the UE device 106 may use antenna(s) 435 to perform the wireless communication.

As described further subsequently herein, the UE 106 may include hardware and software components for implementing part or all of the methods described herein. The processor 402 of the UE device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE device 106, in conjunction with one or more of the other components 400, 404, 406, 410, 420, 430, 435, 440, 450, 460 may be configured to implement part or all of the features described herein.

Figure 5:
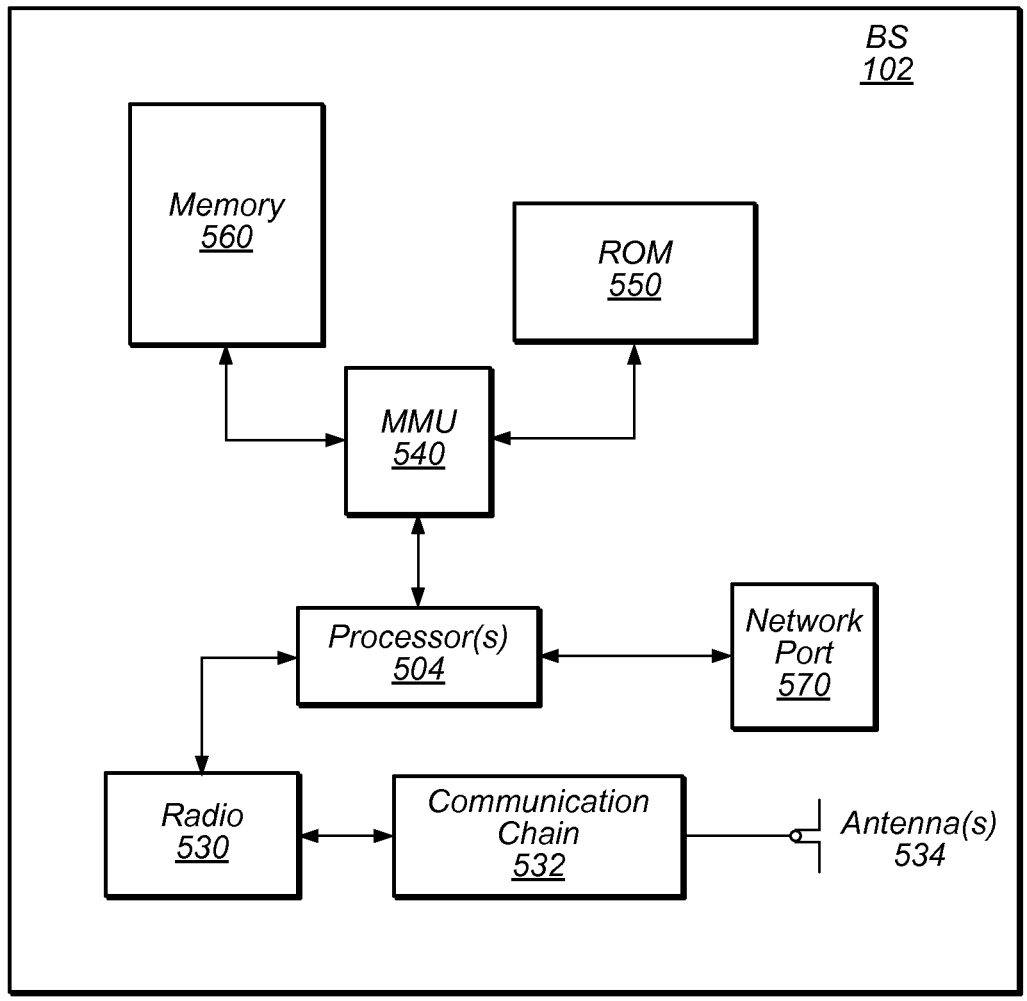
FIG. 5 illustrates an exemplary block diagram of a BS, according to some embodiments.

FIG. 5—Base Station

FIG. 5 illustrates an exemplary block diagram of a base station 102, according to some embodiments. It is noted that the base station of FIG. 5 is merely one example of a possible base station. As shown, the base station 102 may include processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UE devices 106, access to the telephone network as described above.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices serviced by the cellular service provider).

The base station 102 may include at least one antenna 534, and possibly multiple antennas. The antenna(s) 534 may be configured to operate as a wireless transceiver and may be further configured to communicate with UE devices 106 via radio 530. The antenna(s) 534 communicates with the radio 530 via communication chain 532. Communication chain 532 may be a receive chain, a transmit chain or both. The radio 530 may be configured to communicate via various wireless communication technologies, including, but not limited to, LTE, LTE-A, GSM, WCDMA, CDMA2000, Wi-Fi, etc.

The processor(s) 504 of the base station 102 may be configured to implement part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof.

Figure 6:
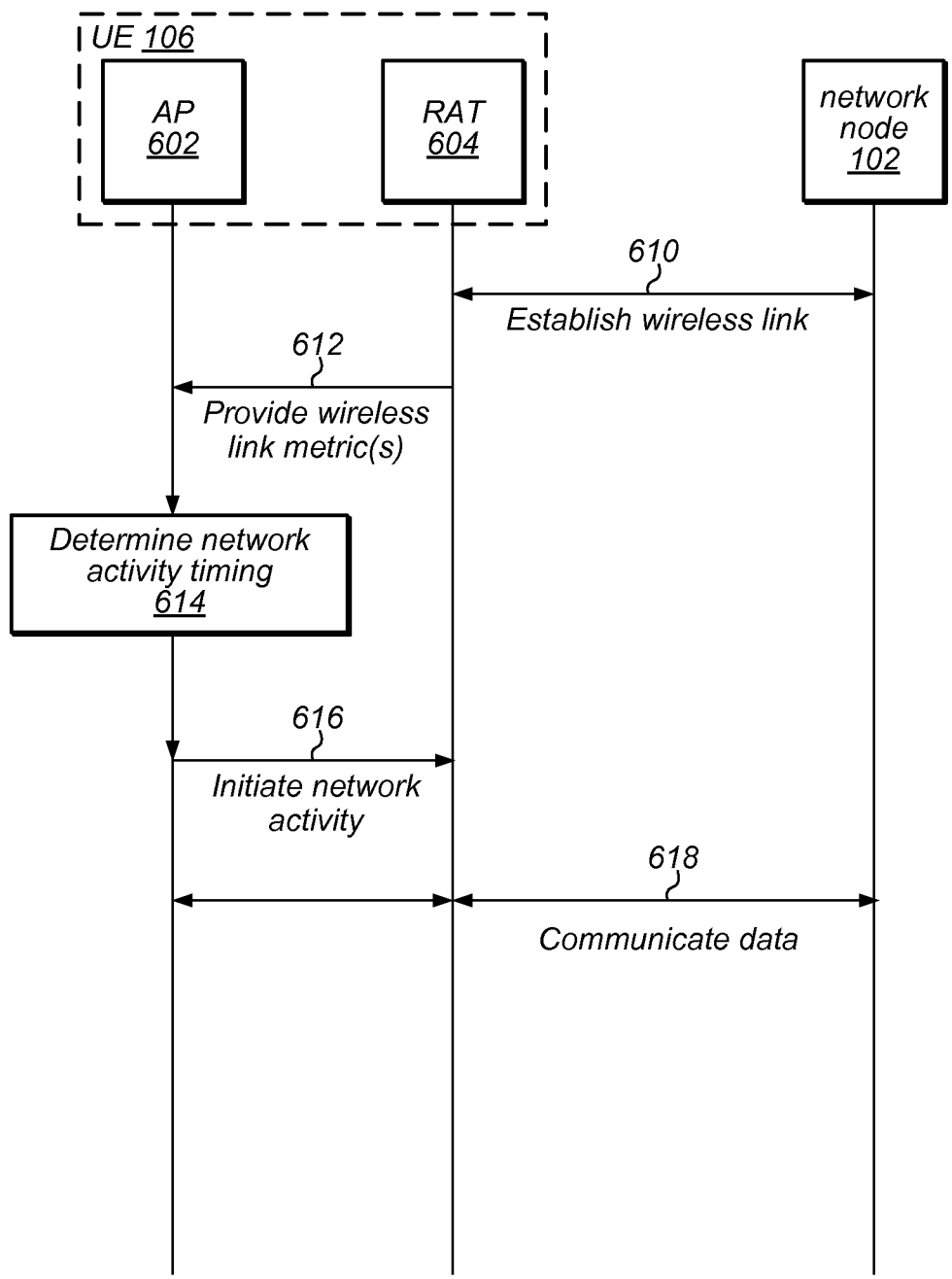
FIG. 6 is a communication flow diagram illustrating an exemplary method for coalescing application data activity using baseband triggers, according to some embodiments.

FIG. 6—Communication Flow Diagram

Many different types of networking data exchanges may be used by networking applications. One possible distinction that may be made between types of networking data exchanges may be between foreground data exchanges and background data exchanges. Foreground data exchanges may be considered higher priority data exchanges, and may typically include user-initiated data exchanges, such as for voice- and video-calls, active game use, media applications, webbrowsing, and/or any of various other uses. Background data exchanges may be considered lower priority data exchanges, and may include data exchanges which occur without explicit user initiation, such as for data synchronization purposes, location updates, application updates, and/or any of various other uses. In many instances, background data exchanges may have some degree of delay tolerance.

Wireless link usage, including cellular link usage, may (at least in some instances) cause a substantial portion of the total power consumption of a wireless device. Inefficient use of the wireless communication capabilities of a wireless device may increase the power consumption caused by such a wireless device's wireless communication operations. It may be common for a wireless device to be capable of improving the efficiency of its wireless communication by operating in a "connected mode" or a "connected state" in order to perform network data exchange, and operating in an "idle mode" or an "idle state" (in which power consumption is reduced) when data is not actively being exchanged.

According to some embodiments, a wireless device may enter the connected mode (e.g., from the idle mode) in a device-initiated manner, e.g., by performing a random access procedure (RACH), or in a network-initiated manner, e.g., as a result of receiving a paging message from its serving cell. For example, e.g., using a cellular RAT, the wireless device may RACH to transition to the connected mode in order to communicate delay sensitive data if the wireless device is not already in the connected mode. Similarly, if the network has data to communicate to the wireless device, the network may page the wireless device to cause a transition to connected mode, so that the network may then be able to communicate the data to the wireless device.

Transitioning between the idle and connected modes/states may require a certain amount of signaling overhead, so at least in some instances the power usage and performance efficiency of a wireless device may be further increased by reducing the number of state transitions between the idle and connected modes/states. For example, consider a scenario in which a wireless device has transitioned to connected mode in order to perform networking activity for one application, such as might be triggered by delay sensitive network activity, such as keep-alives, network address translation (NAT) timers, etc. If networking activity for another application (e.g., delay tolerant network activity) is performed while the wireless device is still in connected mode, this may reduce signaling overhead and power consumption and increase network resource use efficiency compared to if the wireless device were to release the connection after completing the networking activity for the initial application then later transition back to connected mode to perform the networking activity for the second application.

Alternatively, or in addition, it may be possible to improve the power usage and performance efficiency of a wireless device by triggering delay tolerant network activity when link quality is good (e.g., even if the device is not already in the connected mode). For example, by utilizing a wireless link when its quality is good, it may be the case that data transfers can be completed more quickly and consume less power than if such data transfers are attempted when link quality is lower (e.g., poor or bad), e.g., as better link quality conditions may allow higher throughput communication and/or lower transmit power.

Given the potential delay tolerance of background data, it may (at least in some instances) be possible to coordinate network data activity for multiple applications to utilize the same connection based on link information (such as wireless link state and/or quality information) in a manner that may reduce power consumption and improve performance, thus potentially benefiting user experience. FIG. 6 is a communication/signal flow diagram illustrating an example method for such coalescing of application data activity using link information, according to some embodiments.

The scheme shown in FIG. 6 may be used in conjunction with any of the computer systems or devices shown in the above Figures, among other devices. In various embodiments, some of the elements of the scheme shown may be performed concurrently, in a different order than shown, or may be omitted. Additional elements may also be performed as desired. Note that while various discussions in FIG. 6 provide examples that may apply to cellular RATs, similar embodiments are also envisioned for other RATs, such as WLAN and Bluetooth. As shown, the scheme may operate as follows.

In 610, a wireless user equipment (UE) device 106 and a network node 102 (e.g., a base station) may establish a wireless link. In some embodiments, the wireless link may be a cellular link, although other wireless links are also envisioned, such as WLAN or Bluetooth links. For cellular RATs, establishing the wireless link may include camping on a cell provided by the base station in an idle mode, and/or may include operating in a connected mode. For example, according to certain cellular communication technologies the UE 106 may operate in either of a radio resource control (RRC) idle state or a RRC connected state with respect to the wireless link at any given time. The wireless link may transition between such idle- and connected-states any number of times, e.g., according to link conditions, data queued to be exchanged, and/or any of various other considerations.

The wireless link may be established with the communication node 102 by a RAT 604 (e.g., using associated radio/wireless communication circuitry) of the UE 106. The RAT may monitor and manage the wireless link between the UE 106 and the communication node 102. For cellular RATs, managing and monitoring the wireless link may include performing cell searches, cell measurements, cell selection, setting up and tearing down connected mode, transmitting and receiving data over the wireless link, and/or any of various other baseband operations.

The UE 106 may also include an application processor (AP) 602. The application processor may support user applications, including providing an operating environment for such applications (e.g., potentially including any or all of graphics processing, memory management, network interface capability with the baseband processor, and/or any of various other functions) and executing the applications themselves.

In 612, the RAT 604 may provide one or more wireless link metrics to the AP 602. The information may be provided to a networking entity (e.g., a scheduler or RAT abstraction entity) operating on the AP 602, at least in some instances. The wireless link metric(s) may include any of various types of information. As one possibility, the wireless link metric(s) may include link state information which indicates whether the wireless link is in the connected state or the idle state. Alternatively, or in addition, the link state information may indicate whether the wireless link is available at all. For example, in some instances one or more types of wireless communication service might be unavailable for data activity. Note that a wireless link may be considered "unavailable" for the purposes of the wireless link metrics, at least in some instances, under certain circumstances in which the wireless link may still be available for purposes other than data transmission; for example, in some scenarios, it may be the case that a wireless link is available for voice only and not for data, or might be available for emergency calls only. Alternatively, it may be the case that there may be no wireless link established at all for those types of wireless communication service.

As a still further possibility, the link state information may indicate a wireless link quality level (which may be based on any of various desired link quality measurements such as RSRP, RSRQ, RSCP, Ec/Io, SNR, etc., and may be defined in any of various possible manners, as desired) of the wireless link. In some instances, the wireless link quality level may be determined in a different way if the wireless link is in the idle mode than if the wireless link is in the connected mode. For example, as one possibility, in idle mode, link quality might be determined based on downlink channel conditions, an estimated throughput of the wireless link, and/or any of various other possible considerations. As another possibility, in connected mode, link quality may be determined based on random access procedure (RACH) failures, radio link failures (RLFs), actual throughput, retransmission level, power consumption, and/or any of various other possible considerations. In some instances, the wireless link quality level may be defined as having three levels (e.g., "good", "poor", and "bad"): a first level may indicate that link quality is above a predefined threshold, a second level may indicate that link quality is below the predefined threshold, and the third level may indicate that one or more failures (e.g., RLFs and/or RACH failures) have been recently observed. Any number of other levels and/or definitions may be used, as desired.

The wireless link metrics may be provided from the RAT 604 to the AP 602 upon request and/or automatically, and may be provided in a periodic and/or aperiodic manner. As one possibility, certain wireless link metrics (e.g., wireless link state/quality metrics) may be generated by the RAT 604 and provided to the AP 602 whenever one of the reported state variables changes. For example, if the wireless link transitions from the idle state to the connected state, this may trigger generation and provision of a wireless link metric report from the RAT 604 to the AP 602. As another (additional or alternative) possibility, some or all wireless link metrics may be generated and provided from the RAT 604 to the AP 602 at periodic intervals (e.g., even if no state variables have changed since a most recent report). Other algorithms for determining when the wireless link metrics are generated and provided from the RAT 604 to the AP 602 are also possible.

In some instances, the networking entity may receive (e.g., as part of or in addition to) and/or store (e.g., based on wireless link metrics previously received) wireless link history information for the wireless link. For example, the networking entity may store information indicating previous networking nodes (e.g., cell IDs) to which the wireless device has attached, previous wireless link durations (connected mode durations, durations of time attached to cells, etc.), historical estimated (potentially with standard deviation) and/or actual wireless link throughput, historical wireless link quality metrics, and/or any of various other information, for any desired period of time (e.g., on the order of seconds, minutes, hours, days, weeks, and/or any other desired scale). Such historical wireless link history information storage and use may also be depend and/or be associated with user location, e.g., if desired.

In some instances, the networking entity may also or alternatively query the RAT 604 to request an estimate of the maximum achievable throughput of the wireless link. Such an estimate may or may not be available from the RAT 604 in various scenarios, e.g., depending on the type of wireless link. For example, maximum achievable throughput estimation may be possible for RAT 604 for certain types of wireless links (e.g., which operate according to certain wireless communication technologies, such as LTE) but not for other types of wireless links. The RAT 604 may respond to such a query with a response indicating its estimate of the maximum achievable throughput of the wireless link, if available, or alternatively may indicate that such an estimate is not available.

The networking entity may also receive requests from various applications executing on the AP 602 to perform network activities, which may include foreground and/or background data activities. Such network activity requests may have vary in any number of characteristics, any or all of which may affect when network activity is initiated based on a given network activity requests. For example, different network activity requests may have different delay sensitivities. Some requested network activities (e.g., foreground activities) may be more delay intolerant, while other requested network activities (e.g., background activities) may be more delay tolerant. As another example, different network activities may be of different scopes: some may include large data transfers, while others may include small data transfers. At least in some instances, some or all network activity requests may indicate any timing constraints associated with those network activity requests, for example including whether a network activity request is a foreground or background data transfer, a window of time to complete the data transfer, etc.

In 614, the networking entity may determine (e.g., select or coordinate) timing for initiating requested network activities. The determined timing may be based at least in part on any constraints (e.g., due to delay sensitivity, etc.) of the requested network activities, and may also be based at least in part on the wireless link metrics, among various possible considerations. For example, in some embodiments, a scheduler may perform this timing determination, as discussed more detail below, e.g., regarding FIGS. 7-10.

In 616, the networking entity may initiate requested network activities according to the determined timing. This may include providing data corresponding to each requested network activity to the RAT 604 at the time selected to initiate each requested network activity.

In 618, the RAT 604 may communicate the data corresponding to each requested network activity with the network node 102. Note that this may include performing at least one uplink transmission and potentially also receiving one or more downlink transmissions for a given network activity; for example, in some instances a background data transfer network activity may include an initial uplink transmission to initiate (request) the background data transfer from an external source (e.g., an application server), following which downlink data transmission from the external source to the application that requested the network activity may occur, by way of the wireless link between the UE 106 and the network node 102. If the wireless link is in the connected state, the data communication may occur on the existing connection. If the wireless link is in the idle state, a transition to the connected state may occur (e.g., an RRC connection may be established for a cellular RAT) and the data communication may occur on the newly set up connection.

Note that the timing for initiating requested network activities may be determined by the networking entity executing on the AP 602 in any of various ways in view of the various possible considerations. In some instances, the networking entity may attempt to select (e.g., coordinate) network activity initiation timing such that multiple applications' networking activities are coalesced to minimize the number of connections created and maximize use of those connections. In some instances, the networking entity may furthermore attempt to select network activity initiation timing such that connections are initiated at times when link quality is good and/or estimated available throughput is high, and/or to maximize use of existing connections for which link quality is good and/or estimated available throughput is high.

For example, the networking entity may be configured such as to trigger initiation of multiple requested networking activities together when possible (e.g., given other constraints). As one possibility, this may include delaying initiation of requested network activities with sufficient (e.g., above a threshold) remaining delay tolerance if the wireless link is not already in the connected state (e.g., if the wireless link is in the idle state or unavailable). Once the wireless link transitions to the connected state, any or possibly all such network activities may be initiated (e.g., triggered together), thus potentially maximizing use of that connection. Note that initiating the network activities may include handling the network activities on behalf of the applications requesting the network activities, or providing notifications to the applications requesting the network activities to proceed, or some combination thereof, among various possibilities.

Note that any number of other considerations (e.g., based on the given constraints for each requested network activity) may also affect the network activity initiation timing, as desired. For example, if the delay tolerance of a requested network activity decays below a desired threshold while the wireless link remains in the idle state, this might trigger initiation of the requested network activity, which may in turn trigger a transition to the connected state. Note that in some instances this may in turn trigger initiation of other requested network activities which were previously delayed due to the wireless link being in the idle state.

As another possibility, if a certain number (e.g., at or above a desired threshold) of network activities have been requested and are being delayed due to the wireless link being in the idle state, and wireless link quality of the wireless link is good (e.g., above a desired threshold), this may be used as a condition to trigger initiation of the requested network activities.

As a still further possibility, in some instances a network activity initiation timing may be based at least in part on historical wireless link information. For example, for a large (e.g., above a desired size threshold) data transfer with is requested, the networking entity may select a time within the delay tolerance of the requested network activity during which good link conditions may occur, available throughput may be high, user activity may be minimal, and/or any of various other desired conditions may be predicted to exist based on the historical wireless link information. This may help minimize the impact of such large data transfers on user experience, increase the performance of such large data transfers, and/or reduce the power consumption of such large data transfers, in various scenarios.

In some instances, any number of additional connected mode metrics may be provided from the RAT 604 to the AP 602 when the wireless link is in the connected state. Such information may be provided to the transmission control protocol (TCP) stack, as one possibility, and may be used to help coalesce TCP operations in view of the current condition of the wireless link, which may represent the "first hop" for a TCP connection.

For example, the connected mode metrics may include any of various uplink, downlink, and/or common uplink and downlink metrics. The uplink metrics may include any or all of effective bandwidth, maximum bandwidth, average queue size, minimum queue size, maximum queue size, minimum latency, average latency, maximum latency, a percentage of data lost, a metric (e.g., a percentage, or a level selected from multiple possible predefined levels such as high, medium, low, or none, among various possibilities) indicating how frequently packet retransmissions (e.g., potentially including L2 (RLC) retransmission and/or L1 (HARQ) retransmission) occur, and/or any of various other possible uplink metrics. The downlink metrics may include any or all of effective bandwidth, maximum bandwidth, and/or any of various other possible downlink metrics. The common metrics may include a link quality metric (which may be based on RSRP, RSRQ, RSCP, SNR, Ec/Io, and/or any of various other measurements, e.g., depending on wireless link type among various other possible considerations), an idle inactivity time parameter (e.g., indicating an amount of inactivity time remaining until the connection is released and the wireless link transitions to idle), a connection backoff time (e.g., indicating an amount of backoff time enforced before establishing a new connection), and/or any of various other possible common metrics.

Any of a variety of TCP/IP stack operations may be influenced by such connected mode metrics under various circumstances, including determining whether and when to perform FIN retransmissions, TCP RST messages, TCP keep-alive and app keep-alive messages, when to delay background traffic, and/or to account for sleep duration for TCP timers. Such connected mode metrics may also be used in other TCP stack optimizations in some instances, for example for adaptive queue management and/or congestion avoidance.

In some instances, such connected mode metrics may be provided by the RAT 604 as a connected mode report provided to a packet data protocol (PDP) driver on the AP 602, which may strip the PDP header and transfer the payload to the TCP stack using a kernel API. Such a connected mode report may not be generated if the AP 602 is asleep, and/or the connected mode metrics may not be generated if the TCP reports an empty buffer (i.e., a buffer status with a zero value), at least in some embodiments; this may help minimize overhead and avoid bringing up a dormant bus.

Thus, it may be possible to coalesce or merge network activities of multiple applications (e.g., AP clients) based on link information, which may result in more efficient connection usage. Triggering the network activities of multiple applications together (e.g., to utilize an already established connection, to establish an connection at a time when link quality is good, and/or according to any of various possible triggers, as described previously herein), for example by concurrently providing notifications to each of one or more applications perform their network activities when a triggering condition occurs, may improve the coordination of application network activities in comparison to allowing each AP client to determine its own network activity timing without reference to the timing of other AP clients.

Selecting Among Multiple RATs for Data from Multiple Applications

As discussed above, the mobile device 106 may be configured to communicate using any number radios (e.g., WLAN, Cellular, Bluetooth radios), resulting in multiple networking technologies to choose from for various communications (including multiple possibilities for a single radio, such as cellular). Each radio and/or RAT may have its own power characteristics and energy-per-byte cost. Additionally, each radio and/or RAT may have operating points for which energy-per-byte consumption is non-linear. For example, a cellular RAT may require significant power upfront costs just to bring the wireless communication circuitry (e.g., the baseband circuitry) into high power mode to perform wireless communication. However, once the cellular radio is in that powered state, the per-byte costs may be relatively small. WLAN and Bluetooth RATs have their own power consumption profiles and trade-off points, but are generally similar in having a lower per-byte cost once fully powered on.

Accordingly, it may be desirable to operate the mobile device to drive the scheduling of application workload top-down to best leverage multiple, diverse networking technologies or RATs. For example, the RATs' properties may be abstracted to a point that the knowledge of networking technologies' power efficiencies may not get propagated upwards, e.g., in a bottom-up fashion. In this way, the higher-order software may not be contaminated by networking specifications that are low-level, media-dependent, and/or subject to churn from one hardware revision to the next.

In some embodiments, the information of an application's intent (e.g., desired network activity and/or wireless communication) may be driven from the top down in the system in the form of a deadline (e.g., a time when the information or networking activity is needed by an application) and a leeway (e.g., how flexible the application is in receiving that information). Accordingly, the further out the deadline and the leeway are in time, the more opportunities there are to perform communication coalescing and harness energy efficiencies, as discussed herein. Note that while the deadline and leeway may be used in the embodiment described above, alternatively, a single variable may be used to provide the sense of urgency for the information, e.g., the deadline above or some other variable indicating the urgency, such as a value using a scale from very urgent (e.g., 10) to not urgent (e.g., 1). Of course other factors or multiple variables may also be used.

For each networking technology (e.g., RAT) available in the mobile device, a power-aware window of opportunity to send/receive data may exist. This window of opportunity may be bound in both time and capacity dimensions, e.g., which may be analogized to a bin with a fixed volume; depending on the specific networking technology, the bin may have more or less volume, and comes around to carry new work more or less frequently.

By using the urgency information (e.g., the deadline and/or leeway), the mobile device may be configured to match the application's information request to the best window(s) of opportunity of the RATs. As a result, the mobile device may save energy by a) letting those windows of opportunity that are not well suited go by and b) fitting multiple applications into the same window of opportunity (which is akin to packing the bin up its maximum volume, but no more). Point a) avoids starting activities that are doomed to fail later on, and yet would needlessly consume energy. Point b) allows the mobile device to coalesce more application communication activity into the same window of opportunity, e.g., such that they partake on all its non-linear power costs. By following this embodiment, the more applications participate, the higher yield in energy savings. In addition, coalescing data may provide additional advantages, by virtue of making the communication from the UE more bursty (as it lumps together multiple, otherwise independent traffic streams). For example, if the network side is congested (e.g., such as in a stadium), the UE's operation may be advantageous as it may engage the network less often. At the same time, the UE may provide additional savings for itself in such a congested system by decreasing connection attempts to a network that is saturated, thereby avoiding some amount of connection retries and failures. As another example, if the UE is communicating peer-to-peer with another device that is similarly power constrained, then once again the increased burstiness of the communications may yield energy efficiencies by communicating less often and consolidating value around the fewer communication bursts.

In some embodiments, this abstraction may be implemented via an API of the UE. For example, developers may design applications for the UE using an API that allows each application to act as a data source and provide requests to the scheduler.

FIGS. 7-10—Example Operation

Figure 7:
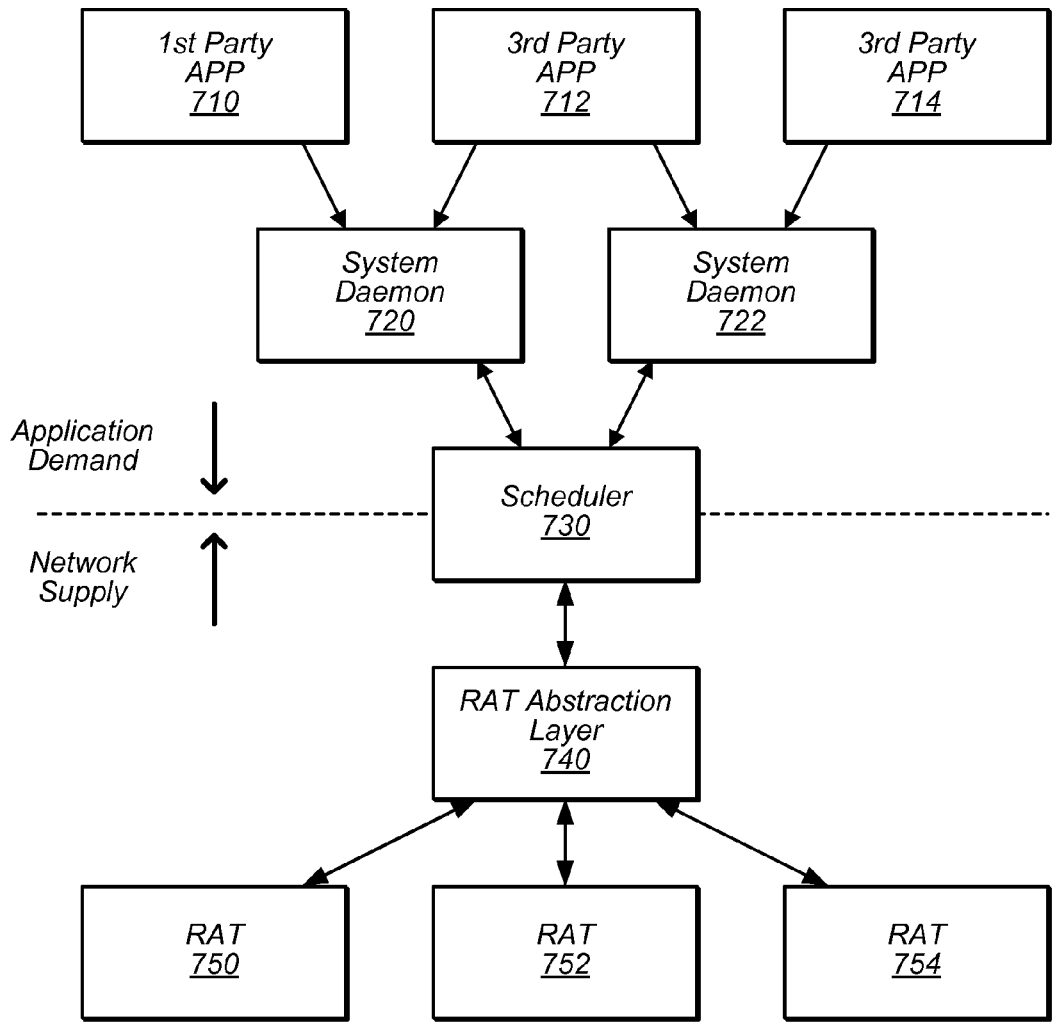
FIG. 7 is a block diagram illustrating an exemplary architecture for coalescing application data activity, according to some embodiments.

FIGS. 7-10 illustrate an embodiment according to one example operation. In more detail, FIG. 7 illustrates an exemplary architecture that may be implemented by the UE. In this architecture, one or more applications may be executed by the UE, including first party application 710 and third party applications 712 and 714. The first party application 710 may be any desired application provided by the manufacturer of the UE, such as an email client, weather application, stock application, phone application, etc. Third party applications 712 and 714 may be any of various applications provided by a company other than the manufacturer, such as a social media application (e.g., Twitter, Facebook, etc.), gaming application, music application, email client, photo sharing application, productivity application, etc.

The applications may be in communication with one or more system daemons 720 and 722. The system daemon may be a first-party only, trusted process which may receive a job or request from one of the applications 710, 712, or 714 and may handle it on the application's behalf. The system daemons 720 and 722 may be particularly useful when the UE is in an idle state (e.g., while not in use), since the applications may only be able to perform limited functionality during that state. In the example of FIG. 7, the applications 710 and 712 may be in communication with the system daemon 720 and the applications 712 and 714 may be in communication with the system daemon 722.

In turn, the system daemons 720 and 722 may be in communication with scheduler 730. The scheduler 730 may perform the matching between application demand (from applications 710, 712, and 714 via system daemons 720 and 722) and network supply, discussed below.

On the network supply side, the RAT abstraction layer 740 may provide an abstracted interface between the scheduler 730 and RATs 750, 752, and 754 (e.g., cellular, WLAN, Bluetooth RATs). In some embodiments, the RAT abstraction layer may ensure that information from the RATs 750, 752, and 754 are provided in a uniform manner, e.g., indicating one or more of: a window of opportunity opening or closing, bandwidth of X, latency of Y, link quality information, etc., which may apply to all RATs independently of their properties.

Each RAT may be interface specific, network specific, and/or device version specific. The RAT abstraction layer 740 may allow the UE to avoid any potential interference these different versions might cause for the scheduler 730.

Of course, the various components shown in FIG. 7 are exemplary only and various ones may be removed, modified, or added in envisioned embodiments.

Figure 8:
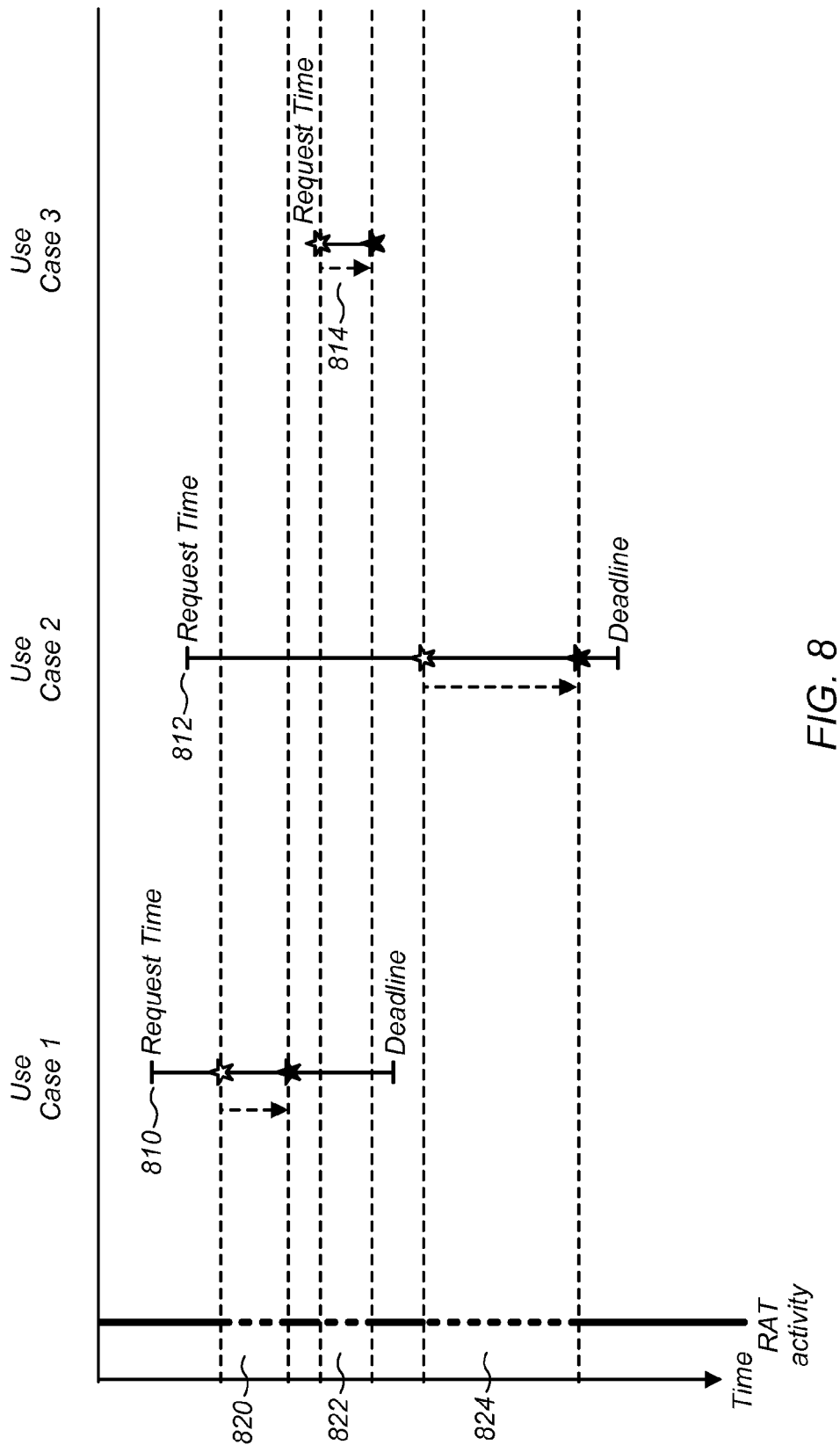
FIGS. 8 and 9 are exemplary timing diagrams showing uncoalesced and coalesced RAT activity.
Figure 9:
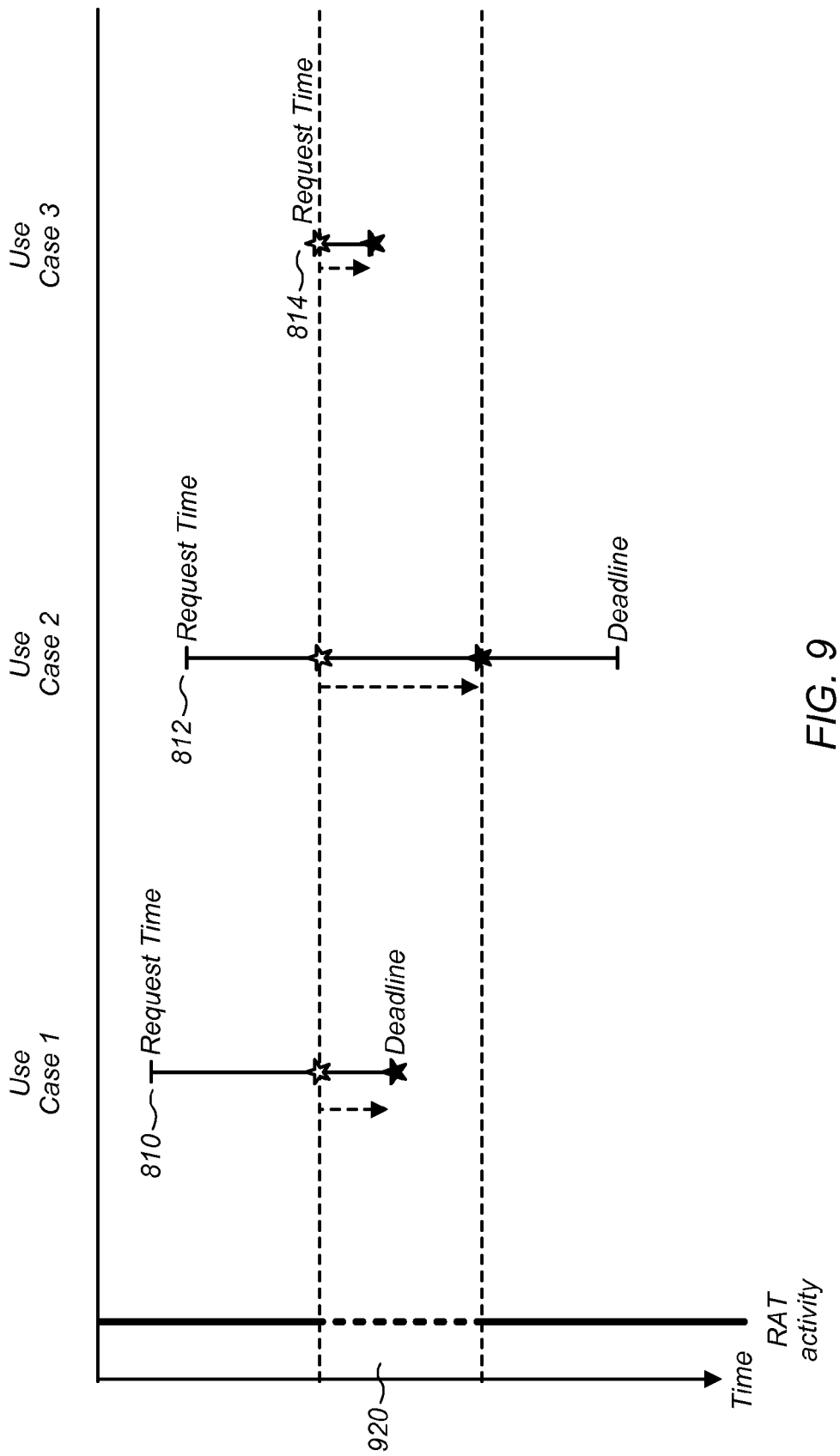

FIGS. 8 and 9 illustrate exemplary timing diagrams before and after coalescing application data activities for a simplified operation. In these timing diagrams, only a single selected RAT is shown, but following descriptions herein, other RATs may also have windows of opportunity. Accordingly, while only a single RAT is shown for the coalescing, various embodiments include selecting among a plurality of RATs for performing the coalescing of communication activities.

FIGS. 8 and 9 illustrate exemplary timing diagrams involving three use cases. Use case 1 may refer to applications which may involve periodic updates, such as social networking applications, weather applications, stock applications, etc. Use case 2 may refer to applications which involve scheduled background transfers, such as software updates, photo synchronization, data synchronization, etc. Use case 3 may refer to instant use cases, such as user or system initiated actions that require immediate attention. Accordingly, the deadline for the request is relatively short for use case 3, relatively long for use case 2, and in between for use case 1.

In FIG. 8, the RAT alternates between powered on and powered off on three separate occasions, one for each use case, as shown by on periods 820 (for use case 1), 822 (for use case 3), and 824 (for use case 2). As discussed above, powering on wireless communication circuitry is generally expensive, consumption-wise, compared to per-byte consumption once it is already powered on. Accordingly, there are significant power savings opportunities, which are addressed in FIG. 9.

In particular, in FIG. 9, rather than powering on and off the wireless communication circuitry of the selected RAT for each different use case, the UE may adaptively and intelligently group all three uses cases into a single window of opportunity, during time 920, thereby providing energy savings over FIG. 8 by avoiding two instances of wireless communication circuitry power-up, but still meeting the deadlines of all three. In this example, the tasks of all three uses cases are initiated at the beginning of time 920 and use case 2 completes last (e.g., potentially involving a larger data transfer). After completion of all three uses cases, all before respective deadlines, the wireless communication circuitry may be powered down.

Figure 10:
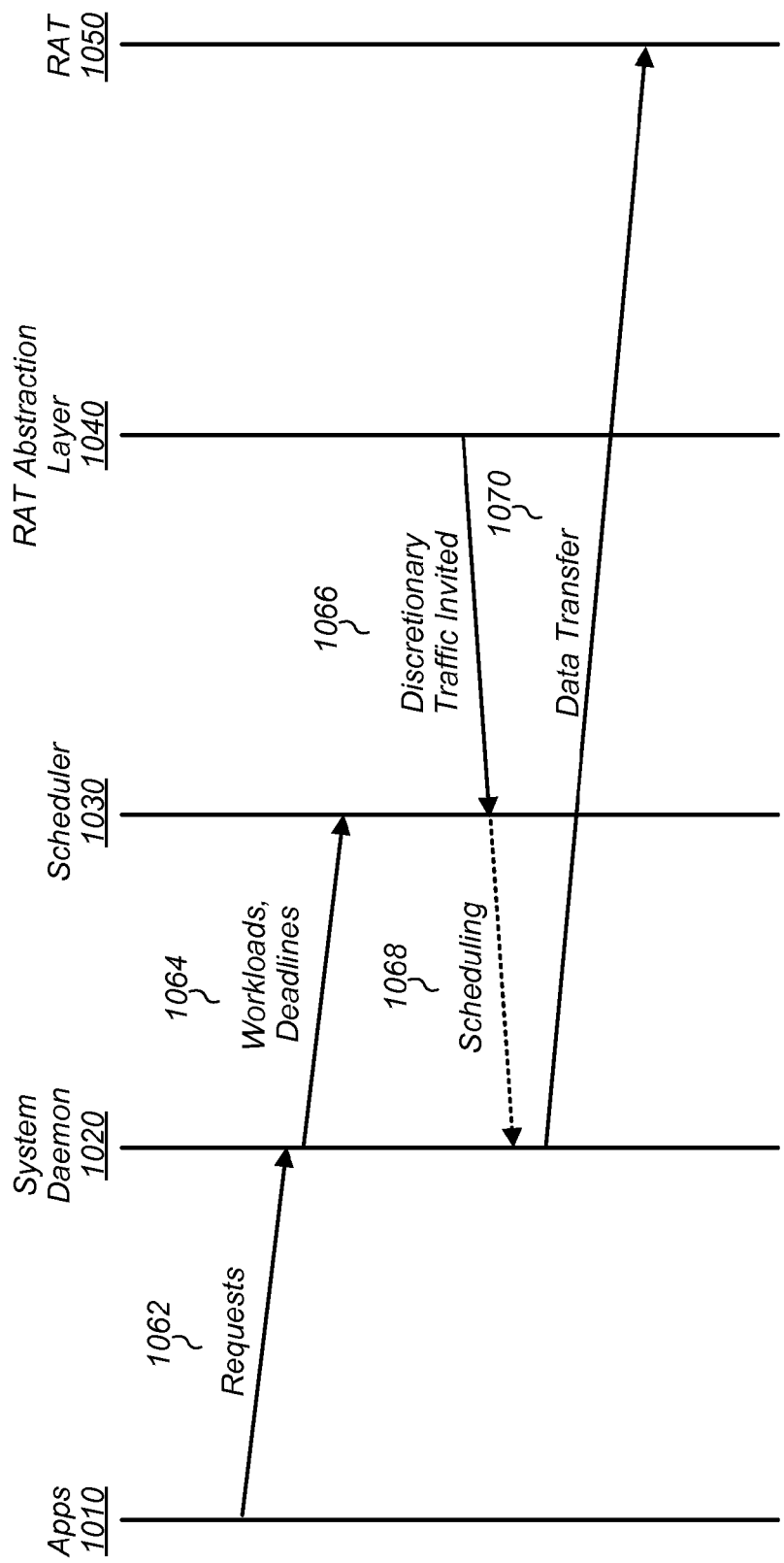
FIGS. 10 and 11 are communication flow diagrams illustrating exemplary methods for selecting a RAT and coalescing application data activities for transmission using the RAT, according to some embodiments.

FIG. 10 illustrates an exemplary communication flow diagram corresponding to the block diagram of FIG. 7. As shown in FIG. 10, a plurality of applications 1010 may provide requests 1060 to perform communication or data activities to corresponding system daemon(s) 1020. The requests may include various information such as a descriptor of the requested activity (e.g., uploading data, transmitting a request, downloading data, etc.), a deadline for the activity, an estimated size of the requested activity (e.g., estimated size of transmission to network), and/or other information. In turn, the system daemon(s) 1020 may provide relevant information of the requests 1064 (or the requests themselves) to the scheduler 1030. In some embodiments, the system daemon(s) 1020 may aggregate the requests, or information extracted from the requests such as workload, deadlines, etc., and provide the aggregated information to the scheduler 1030.

The scheduler 1030 may also receive an indication from the RAT abstraction layer 1040 of the available windows of opportunity from the various RATs, such as the RAT 1050, in 1066. Accordingly, the scheduler 1030 may match the various requests with the available windows of opportunity of the RAT 1050 and provide scheduling information in 1068 to the system daemon(s) 1020. Finally, in 1070 the data transfer of the requests may be performed according to the schedule generated by the scheduler 1030.

Figure 11:
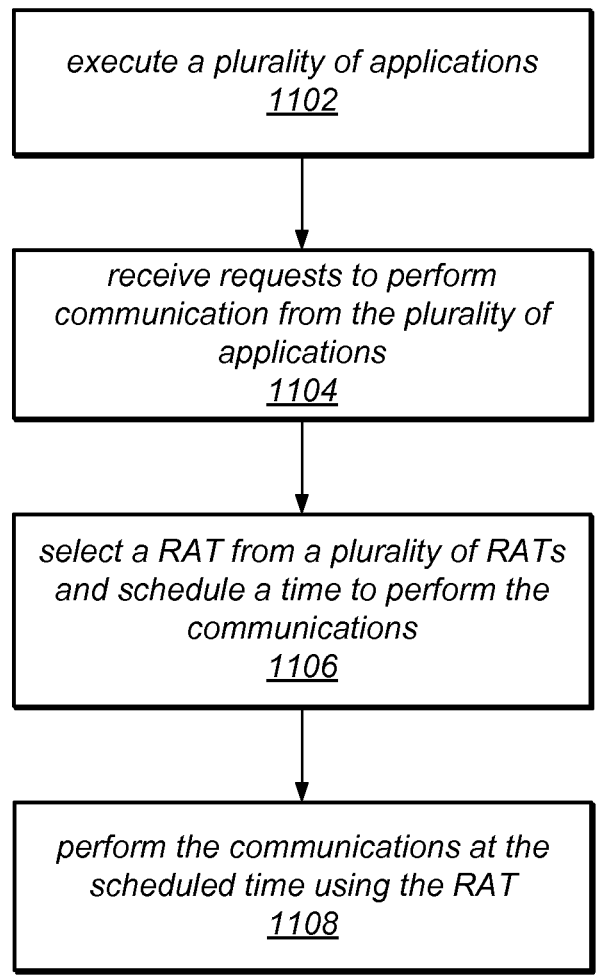

FIG. 11—Coalescing Application Data Activities for Transmission Using a RAT

FIG. 11 is a flowchart diagram illustrating a method for selecting a RAT and coalescing application data activities for transmission using the RAT. The method may be performed by a UE device (such as UE 106), e.g., using the systems and methods discussed above. More generally, the method shown in FIG. 11 may be used in conjunction with any of the systems or devices shown in the above Figures, among other devices. In various embodiments, some of the method elements shown may be performed concurrently, in a different order than shown, or may be omitted. Note also that additional method elements may also be performed as desired. The method may be performed as follows.

In 1102, a plurality of applications may be executed by the UE. As discussed above, the applications may be any of various types, such as email applications, browser applications, music applications, gaming applications, stock applications, weather applications, etc. At various points in time, these applications may need to make use of wireless communication to perform a network activity (e.g., involving a communication using a RAT). The communication may be a foreground activity (e.g., providing data in response to user input or a system request) with high urgency or a background activity (e.g., periodic updates to data that is refreshed periodically, such as social network information, stock information, etc., or more irregular activities such as software updates, photo uploads, etc.), e.g., with less urgency.

In 1104, a plurality of requests may be received from the plurality of applications, e.g., by a scheduler of the UE. Each request, corresponding to a respective application, may include information for performing a network activity or communication. For example, the request may specify an urgency and/or deadline for performing the communication (and potentially a leeway for that deadline), an estimated data size of the communication, a descriptor or identifier of the communication task and/or the submitting application, and/or other information. While the requests may be foreground and/or background transmission requests, in some embodiments, the requests of 1104 may be background transmission requests.

As a more specific example, the UE may receive a first request from a first application having a first deadline and a second request from a second application having a second deadline. The first request may be received at a first time prior to receiving the second request at the second time. However, the first deadline may be after the second time; in other words, the second request may be received prior to the deadline for the first request. Thus, the UE may be configured to receive multiple requests from multiple applications in 1104. Note that the requests of 1104 may be received from a subset of the total number of applications executing or existing on the UE.

In 1106, a RAT may be selected and a time may be scheduled for performing wireless communication corresponding to the requests received in 1104. The RAT selection and time scheduling may be performed as a single process (e.g., at the same time) or separately (e.g., RAT selection followed by time scheduling, or vice versa), as desired.

In some embodiments, the UE (e.g., the scheduler of the UE) may analyze available times or windows of opportunity from a plurality of RATs and may select a time and RAT for performing the wireless communication. As one example, one or more of the RATs may be active (e.g., powered on and connected or ready for a connection). In some embodiments, one of the RATs may be a cellular RAT, such as LTE. The cellular RAT may be operating according to a discontinuous reception or transmission schedule (DRX or DTX, respectively) and so may have a periodic or scheduled availability for performing communication, e.g., during the DRX or DTX on duration. Alternatively, or additionally, a WLAN RAT or Bluetooth RAT may already be connected and may have an upcoming or scheduled transmission for an active application (e.g., a foreground transmission, e.g., in response to user input or as a part of execution of the active application, such as fetching current data in a gaming or productivity application).

Accordingly, where active connections or RATs are available, the UE may determine if one or more of (or all of) the requests may be fulfilled by using an upcoming window of opportunity of one of the RATs. In some embodiments, a closest window of opportunity may be too short, have insufficient bandwidth or link quality, or have some other shortcoming, and so may not be scheduled. However, a later window of opportunity (e.g., of the same or possibly a different RAT) may meet the criteria for selection (e.g., having enough available time or bandwidth, sufficient link quality, etc.). Accordingly, the later window of opportunity may be selected. In some embodiments, the requested data communications may be combined with foreground communications at the selected time using the selected RAT.

Note that the selection of the RAT and/or window of opportunity may be based solely on power consumption characteristics, in some embodiments. For example, the cost per byte for each request, or of the aggregated bundle of requests, may be compared for each RAT and/or window of opportunity, and the lowest cost per byte may be selected. However, in other embodiments, power consumption may only be a factor in making the selection and other factors may be used, such as link quality, time for transmission, etc.

Where only a single RAT is active or expected to be active, that RAT may be selected for the transmission, according to some embodiments. Where multiple RATs are active or expected to be active, the best RAT may be selected initially, followed by the best time for that RAT, or the best window of time may be selected (irrespective of RAT) and the RAT having that window of time may be selected. Where no RAT is presently active or expected to be active within the deadlines of the requests, such as when the UE is in an idle state, the selection may be based on the lowest power cost RAT, a default or preferred RAT, and/or the lowest billing RAT (e.g., WLAN may be preferred over cellular, billing-wise, since the user may not be charged per byte via WLAN).

The selection of the RAT and time may be based on the deadline provided in the requests. More specifically, the selected time may be prior to the deadlines of the plurality of requests. Where no opportunity window or time meets all of the requirements of all of the requests (e.g., due to deadlines, size of transmission, etc.), then the requests may be split into subsets and the scheduling and selection of the RAT may be performed for each subset.

Following the specific example above involving the first and second requests from the first and second applications, a RAT and time may be selected for performing the communications of the first and second requests, which is prior to both the first and second deadlines. Thus, rather than performing the requests separately at different times (such as shown in FIG. 8), both requests may be performed during a same scheduled time using a same RAT (such as shown in FIG. 9), thereby providing better power efficiency for the UE. In order to combine these two requests, performing the data communication for the first request may be delayed until receiving the request from the second application, thus allowing for coalescing of the data communications for the two applications.

In 1108, the requested communications may be performed at the selected time using the determined RAT from 1106.

Various Embodiments

The following paragraphs describe exemplary embodiments of the present disclosure.

One set of embodiments may include a wireless user equipment (UE) device, comprising: a plurality of radios, each configured to communicate using a respective radio access technology (RAT); a processor coupled to the plurality of radios; wherein the processor is configured to: execute a plurality of applications; receive a request to perform communication from each of the plurality of applications, wherein each request comprises a deadline for performing the communication; determine a RAT for performing the plurality of communications; schedule the plurality of communications, wherein said scheduling comprises combining the plurality of communications to be performed at a scheduled time using the RAT; and perform the plurality of communications at the scheduled time using the RAT based on said scheduling.

According to some embodiments, wherein receiving the request to perform communication from each of the plurality of applications comprises receiving a first request from a first application having a first deadline at a first time and receiving a second request from a second application having a second deadline at a second time, wherein the first time is prior to the second time, wherein scheduling the plurality of communications is performed after the second time, wherein the scheduled time is prior to the first deadline and the second deadline.

According to some embodiments, wherein said determining a RAT for performing the plurality of communications comprises determining one or more active RATs and selecting the RAT from the one or more active RATs.

According to some embodiments, wherein said determining a RAT for performing the plurality of communications comprises selecting a preferred RAT of the plurality of RATs.

According to some embodiments, wherein said determining a RAT for performing the plurality of communications comprises selecting a RAT based on link quality information.

According to some embodiments, wherein said determining a RAT for performing the plurality of communications is based on power consumption.

According to some embodiments, wherein the plurality of requests comprise requests to perform background communication, wherein scheduling the plurality of communications comprises combining the background communications with foreground communications at the scheduled time.

According to some embodiments, wherein the plurality of radios comprises at least two of a cellular radio, a wireless local area network (WLAN) radio, or a Bluetooth radio.

According to some embodiments, wherein said scheduling the plurality of communications comprises determining that a next available time is not suitable for the performing the plurality of communications, wherein the scheduled time is after the next available time.

According to some embodiments, wherein said determining the RAT and scheduling the plurality of communications comprises: determining one or more first available times for using a first RAT and one or more second available times for using a second RAT; and determining one of the first available times for performing the plurality of communications; wherein determining the RAT comprises selecting the first RAT based on determining the one of the first available times, and wherein scheduling the plurality of communications at the scheduled time comprises selecting the one of the first available times.

One set of embodiment may include a method, comprising: by a scheduling component executing on a processor of a wireless user equipment (UE) device: receiving a request to perform one or more network activities from each of a plurality of applications executing on the application processor of the UE, wherein each request has an associated deadline for performing the one or more network activities; determining a plurality of opportunities for performing the network activities of the requests associated with a plurality of different radio access technologies (RATs); and using the deadlines, scheduling a time from the plurality of opportunities using a RAT from the plurality of RATs for performing the network activities, wherein, based on said scheduling, each of the network activities are performed at the time using the RAT.

According to some embodiments, wherein determining the plurality of opportunities for performing the network activities comprises analyzing a scheduled network activities for each of the plurality of RATs.

According to some embodiments, wherein determining the plurality of opportunities for performing the network activities comprises determining a time when the respective RAT will be in a connected state.

According to some embodiments, wherein receiving the request to perform one or more network activities from each of the plurality of applications comprises: receiving a first request from a first application at a first time having a first deadline; delaying performing the one or more activities associated with the first application; receiving a second request from a second application at a second time having a second deadline, wherein the second time is after the first time and after delaying performing the one or more activities associated with the first application; wherein determining the plurality of opportunities is performed in response to receiving the second request, wherein the scheduled time is prior to the first deadline and the second deadline.

According to some embodiments, wherein the plurality of different RATs comprises a cellular RAT and a wireless local area network (WLAN) RAT.

According to some embodiments, wherein said scheduling comprises selecting the RAT based on link quality information of the plurality of RATs.

One set of embodiments may include a non-transitory, computer accessible memory medium storing program instructions, wherein the program instructions, when executed by a processor of a wireless user equipment (UE), implement: a plurality of applications, wherein each application is configured to: periodically generate a request to perform communication associated with the respective application, wherein the request comprises a deadline for performing the communication; and provide the request to a scheduler of the UE; and the scheduler, wherein the scheduler is configured to: receive each request from the plurality of applications; using the deadlines, determine a time to combine at least two communications of at least two respective applications and a radio access technology (RAT) among a plurality of available RATs for performing the at least two communications at the time; wherein the UE is configured to perform the at least two communications at the time using the RAT.

According to some embodiments, wherein determining the RAT comprises determining one or more active RATs and selecting the RAT from the one or more active RATs.

According to some embodiments, wherein determining the RAT comprises selecting a preferred RAT of the plurality of RATs.

According to some embodiments, the plurality of different RATs comprises a cellular RAT and a wireless local area network (WLAN) RAT.

One set of embodiments may include a computer program comprising instructions corresponding to the embodiments discussed above.

One set of embodiments may include an apparatus comprising means for performing methods corresponding to the embodiments discussed above.

One set of embodiments may include a method that includes any action or combination of actions as substantially described herein in the Detailed Description.

One set of embodiments may include a method as substantially described herein with reference to each or any combination of the Figures or with reference to each or any combination of paragraphs in the Detailed Description.

One set of embodiments may include a wireless device configured to perform any action or combination of actions as substantially described herein in the Detailed Description.

One set of embodiments may include a wireless device that includes any component or combination of components as described herein in the Detailed Description as included in a wireless device.

One set of embodiments may include a non-volatile computer-readable medium that stores instructions that, when executed, cause the performance of any action or combination of actions as substantially described herein in the Detailed Description.

One set of embodiments may include an integrated circuit configured to perform any action or combination of actions as substantially described herein in the Detailed Description.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless user equipment (UE) device, comprising:
a plurality of radios, each configured to communicate using a respective radio access technology (RAT);
a processor coupled to the plurality of radios;
wherein the processor is configured to:
    execute a plurality of applications;
    receive a request to perform communication from each of the plurality of applications, wherein each request comprises a deadline for performing the communication;
    determine a RAT for performing the plurality of communications;

schedule the plurality of communications, wherein said scheduling comprises combining the plurality of communications to be performed at a scheduled time using the RAT; and perform the plurality of communications at the scheduled time using the RAT based on said scheduling.

2. The UE of claim 1, wherein receiving the request to perform communication from each of the plurality of applications comprises receiving a first request from a first application having a first deadline at a first time and receiving a second request from a second application having a second deadline at a second time, wherein the first time is prior to the second time, wherein scheduling the plurality of communications is performed after the second time, wherein the scheduled time is prior to the first deadline and the second deadline.

3. The UE of claim 1, wherein said determining a RAT for performing the plurality of communications comprises determining one or more active RATs and selecting the RAT from the one or more active RATs.

4. The UE of claim 1, wherein said determining a RAT for performing the plurality of communications comprises selecting a preferred RAT of the plurality of RATs.

5. The UE of claim 1, wherein said determining a RAT for performing the plurality of communications comprises selecting a RAT based on link quality information.

6. The UE of claim 1, wherein said determining a RAT for performing the plurality of communications is based on power consumption.

7. The UE of claim 1, wherein the plurality of requests comprise requests to perform background communication, wherein scheduling the plurality of communications comprises combining the background communications with foreground communications at the scheduled time.

8. The UE of claim 1, wherein the plurality of radios comprises at least two of a cellular radio, a wireless local area network (WLAN) radio, or a Bluetooth radio.

9. The UE of claim 1, wherein said scheduling the plurality of communications comprises determining that a next available time is not suitable for the performing the plurality of communications, wherein the scheduled time is after the next available time.

10. The UE of claim 1, wherein said determining the RAT and scheduling the plurality of communications comprises:
determining one or more first available times for using a first RAT and one or more second available times for using a second RAT; and
determining one of the first available times for performing the plurality of communications;
wherein determining the RAT comprises selecting the first RAT based on determining the one of the first available times, and wherein scheduling the plurality of communications at the scheduled time comprises selecting the one of the first available times.

11. A method, comprising:
by a scheduling component executing on a processor of a wireless user equipment (UE) device:
receiving a request by the processor to perform one or more network activities from each of a plurality of applications executing on the application processor of the UE, wherein each request has an associated deadline for performing the one or more network activities;
determining a plurality of opportunities for performing the network activities of the requests associated with a plurality of different radio access technologies (RATs);

using the deadlines, scheduling a time from the plurality of opportunities using a RAT from the plurality of RATs for performing the network activities, wherein, based on said scheduling, each of the network activities are performed at the time using the RAT.

12. The method of claim 11, wherein determining the plurality of opportunities for performing the network activities comprises analyzing scheduled network activities for each of the plurality of RATs.

13. The method of claim 11, wherein determining the plurality of opportunities for performing the network activities comprises determining a time when the respective RAT will be in a connected state.

14. The method of claim 11, wherein receiving the request to perform one or more network activities from each of the plurality of applications comprises:
receiving a first request from a first application at a first time having a first deadline;
delaying performing the one or more activities associated with the first application;
receiving a second request from a second application at a second time having a second deadline, wherein the second time is after the first time and after delaying performing the one or more activities associated with the first application;
wherein determining the plurality of opportunities is performed in response to receiving the second request, wherein the scheduled time is prior to the first deadline and the second deadline.

15. The method of claim 11, wherein the plurality of different RATs comprises a cellular RAT and a wireless local area network (WLAN) RAT.

16. The method of claim 11, wherein said scheduling comprises selecting the RAT based on link quality information of the plurality of RATs.

17. A non-transitory, computer accessible memory medium storing program instructions, wherein the program instructions, when executed by a processor of a wireless user equipment (UE), implement:
a plurality of applications, wherein each application is configured to:
periodically generate a request to perform communication associated with the respective application, wherein the request comprises a deadline for performing the communication; and
provide the request to a scheduler of the UE; and
the scheduler, wherein the scheduler is configured to:
receive each request from the plurality of applications;
using the deadlines, determine a time to combine at least two communications of at least two respective applications and a radio access technology (RAT) among a plurality of available RATs for performing the at least two communications at the time;
wherein the UE is configured to perform the at least two communications at the time using the RAT.

18. The non-transitory, computer accessible memory medium of claim 17, wherein determining the RAT comprises determining one or more active RATs and selecting the RAT from the one or more active RATs.

19. The non-transitory, computer accessible memory medium of claim 17, wherein determining the RAT comprises selecting a preferred RAT of the plurality of RATs.

20. The non-transitory, computer accessible memory medium of claim 17, the plurality of different RATs comprises a cellular RAT and a wireless local area network (WLAN) RAT.

* * * * *